United States Patent
Costa-Requena et al.

(10) Patent No.: US 7,830,826 B2
(45) Date of Patent: Nov. 9, 2010

(54) MULTICAST RELAY FOR MOBILE DEVICES

(75) Inventors: Jose Costa-Requena, Helsinki (FI); Holger Hussmann, Tampere (FI)

(73) Assignee: Nokia Corporation, Espoo (FI)

( * ) Notice: Subject to any disclaimer, the term of this patent is extended or adjusted under 35 U.S.C. 154(b) by 536 days.

(21) Appl. No.: 10/884,811

(22) Filed: Jul. 1, 2004

(65) Prior Publication Data

US 2006/0002320 A1    Jan. 5, 2006

(51) Int. Cl.
*H04H 20/71* (2008.01)
*H04M 1/725* (2006.01)
*G06F 15/167* (2006.01)

(52) U.S. Cl. ............... 370/312; 455/412.1; 709/213

(58) Field of Classification Search ............ 370/310, 370/312, 390; 709/21, 223
See application file for complete search history.

(56) References Cited

U.S. PATENT DOCUMENTS

| | | | |
|---|---|---|---|
| 5,515,513 A * | 5/1996 | Metzger et al. ............ 709/249 |
| 5,999,530 A | 12/1999 | LeMaire et al. |
| 6,571,277 B1 * | 5/2003 | Daniels-Barnes et al. ... 709/213 |
| 6,721,290 B1 * | 4/2004 | Kondylis et al. ........... 370/329 |
| 6,917,960 B1 | 7/2005 | Decasper et al. |
| 7,107,442 B2 * | 9/2006 | Cheshire ..................... 713/1 |
| 7,181,521 B2 | 2/2007 | Knauerhase et al. |
| 7,269,629 B2 | 9/2007 | Zmudzinski et al. |
| 7,366,738 B2 | 4/2008 | Yorke et al. |
| 7,403,512 B2 | 7/2008 | Tsai et al. |
| 2001/0037379 A1 | 11/2001 | Livnat |
| 2001/0044835 A1 | 11/2001 | Schober et al. |
| 2002/0152299 A1* | 10/2002 | Traversat et al. ............ 709/223 |
| 2003/0084191 A1 | 5/2003 | Yamamoto |
| 2004/0120301 A1 | 6/2004 | Kitchin |
| 2004/0193609 A1 | 9/2004 | Phan et al. |
| 2004/0233930 A1 | 11/2004 | Colby, Jr. |
| 2004/0246992 A1* | 12/2004 | Henry et al. ............... 370/467 |
| 2005/0135269 A1 | 6/2005 | Saint-Hilaire et al. |
| 2005/0135286 A1 | 6/2005 | Nurminen et al. |
| 2005/0204065 A1 | 9/2005 | Son et al. |
| 2006/0087993 A1 | 4/2006 | Sengupta et al. |
| 2006/0168126 A1 | 7/2006 | Costa-Requena |
| 2006/0168264 A1* | 7/2006 | Baba et al. ................. 709/230 |

(Continued)

FOREIGN PATENT DOCUMENTS

JP    09081630    3/1997

(Continued)

OTHER PUBLICATIONS

U.S. Appl. No. 11/019,934, filed Dec. 21, 2004, Costa-Requena et al.

(Continued)

*Primary Examiner*—Michael T Thier
(74) *Attorney, Agent, or Firm*—Hollingsworth & Funk, LLC

(57) ABSTRACT

Exchanging data between a mobile device and a network involves receiving, via the network, multicast service announcements from a plurality of service providers. The multicast service announcements are stored in a cache. A service search request originating from the mobile device is received. A reply to the service search request is determined based on the multicast service announcements stored in the cache. The reply is provided to the mobile device in response to the service search request.

21 Claims, 5 Drawing Sheets

U.S. PATENT DOCUMENTS

| | | | |
|---|---|---|---|
| 2007/0004436 | A1 | 1/2007 | Stirbu |
| 2007/0219953 | A1 | 9/2007 | Mak |

FOREIGN PATENT DOCUMENTS

| | | |
|---|---|---|
| JP | 2003067296 | 3/2003 |
| JP | 2004227562 | 8/2004 |
| WO | WO2004043043 | 5/2004 |
| WO | WO2004057558 | 7/2004 |

OTHER PUBLICATIONS

Rasheed et al., "High-Quality Media Distribution in the Digital Home", Intel Technology Journal, vol. 6, Issue 4, Nov. 15, 2002.
Debique et al., "ContentDirectory: 1 Service Template Version 1.01", Jun. 25, 2002.
Rousseau et al., "Omnisphere: a Personal Communication Environment", 36$^{th}$ Hawaii International Conference on Systems Sciences, 2003, IEEE Computer Society.
Lee et al., "Context Attributes: an Approach to Enable Context-awareness for Service Discovery", Proceedings 2003 Symposium on Applications and the Internet, 2003, IEEE Computer Society.
Ponnekanti et al., "Application-Service Interoperation without Standardized Service Interfaces", Proceedings of the First IEEE International Conference on Pervasive Computing and Communications, 2003, IEEE Computer Society.
Miller et al., "Home Networking with Universal Plug and Play", IEEE Communications Magazine, Dec. 2001, pp. 104-109.
Oct. 17, 2003, Warrier et al., "WLAN Access Point Device: 1", pp. 1-15.
Mar. 22, 2005, Sinha et al., "UPnP Power Management", pp. 1-31.
Nov. 12, 2001, Schmitz et al., "WANIPConnection: 1 Service Template", Version 1.01, pp. 1-74.
Appeal Brief dated Apr. 23, 2010 from U.S. Appl. No. 11/019,934, 29 pages.
Pre-appeal Brief Statement dated Jan. 22, 2010 from U.S. Appl. No. 11/019,934, 8 pages.
Office Action dated Oct. 22, 2009 from U.S. Appl. No. 11/019,934, 22 pages.
Office Action Response dated Jun. 17, 2009 from U.S. Appl. No. 11/019,934, 13 pages.
Office Action dated Mar. 17, 2009 from U.S. Appl. No. 11/019,934, 19 pages.
Notice of Allowance dated Apr. 6, 2010 from U.S. Appl. No. 11/170,724, 6 pages.
Notice of Allowance dated Jan. 7, 2010 from U.S. Appl. No. 11/170,724, 6 pages.
Office Action Response dated Dec. 3, 2009 from U.S. Appl. No. 11/170,724, 13 pages.
Office Action dated Sep. 16, 2009 from U.S. Appl. No. 11/170,724, 20 pages.
Office Action Response dated Aug. 4, 2009 from U.S. Appl. No. 11/170,724, 59 pages.
Interview Summary dated Jul. 6, 2009 from U.S. Appl. No. 11/170,724, 5 pages.
Office Action dated Jun. 25, 2009 from U.S. Appl. No. 11/170,724, 5 pages.
Office Action Response dated May 29, 2009 from U.S. Appl. No. 11/170,724, 17 pages.
Office Action dated Apr. 8, 2009 from U.S. Appl. No. 11/170,724, 18 pages.
Office Action Response dated Feb. 9, 2009 from U.S. Appl. No. 11/170,724, 16 pages.
Office Action dated Nov. 26, 2008 from U.S. Appl. No. 11/170,724, 19 pages.
International Search Report dated May 18, 2006 from PCT Application No. PCT/IB2005/003926, 10 pages.
International Search Report dated Dec. 12, 2006 from PCT Application No. PCT/IB2006/001822, 15 pages.
International Preliminary Report on Patentability dated Jul. 5, 2007 from PCT Application No. PCT/IB2005/003926, 7 pages.
International Preliminary Report on Patentability dated Jan. 17, 2008 from PCT Application No. PCT/IB2006/003926, 18 pages.
Office Action dated May 25, 2010 from Japanese Application No. 2007-547701, 8 pages.
Office Action dated Aug. 17, 2009 from Korean Application No. 10-2008-7002303, 8 pages.

* cited by examiner

MULTICAST RELAY FOR MOBILE DEVICES

FIELD OF THE INVENTION

This invention relates in general to communications devices, and more particularly to communications devices configured for relaying multicast data.

BACKGROUND OF THE INVENTION

Mobile communications devices such as cell phones are gaining wider acceptance due to the capabilities being added to such devices. Far from being simple voice communications tools, modern cell phones and related mobile technologies have staked out an important niche in the growing field of personal digital communications.

One factor that is expected to increase the popularity of mobile devices is the development of third generation (3G) technologies. The designation 3G refers to a collection of standards and technologies that can be used in the near future to enhance performance and increase data speed on cell phone networks. In particular, 3G is an International Telecommunication Union (ITU) specification for the third generation of mobile communications technology. A 3G cell phone would, in theory, be compatible with the 3G languages or standards which support enhanced data speeds.

The 3G infrastructure aims to provide packet-switched data to a handheld terminal with data bandwidth measured in hundreds of Kbits/sec. It is intended that 3G will work over wireless air interfaces such as Code Division Multiple Access (CDMA), Wideband CDMA (W-CDMA), and the Time Division Multiple Access (TDMA) based General Packet Radio Service (GPRS). The latter interface is included in the Enhanced Data for GSM, Environment (EDGE) air interface which has been developed specifically to meet the bandwidth needs of 3G cell phones.

Future 3G devices may include features that allow communication with other consumer electronics devices. For example, a standard known as Universal Plug and Play™ (UPnP) provides a way for disparate processing devices to exchange data. The UPnP standard defines an architecture for peer-to-peer network connectivity utilizing a wide variety of electronic devices. The UPnP standard includes standards for service discovery, and is mainly targeted for proximity or ad hoc networks.

Various contributors publish UPnP device and service descriptions, thus creating a way to easily connect devices and simplifying the implementation of networks. UPnP is designed to work in many environments, including the home, businesses, public spaces, and on devices attached to the Internet. The UPnP standard is an open architecture that leverages Web technologies and is designed to provide ad-hoc networking and distributed computing.

The UPnP model is designed to support zero-configuration, networking, and automatic discovery for a wide variety of device categories. This allows a device to dynamically join a network, obtain an IP address, convey its capabilities, and learn about the presence and capabilities of other devices. Other Internet protocols such as Dynamic Host Configuration Protocol (DHCP) and Domain Name Service (DNS) may optionally included in a UPnP network, although they are not required. A device can leave a UPnP network smoothly and automatically without leaving any unwanted state behind.

The UPnP architecture includes mechanisms for discovery of devices on the network and mechanisms for describing capabilities of those devices. The UPnP discovery protocol allow a device to advertise its services to control points on the network utilizing multicast messages. Multicasting refers to a sending a single copy of data to multiple recipients on an Internet Protocol (IP) network. IP multicasting relies on two mechanisms: a group management protocol to establish and maintain multicast groups, and multicast routing protocols to route packets. Multicasting combines the benefits of unicasting and broadcasting. Like unicasting, multicast packets are only routed to network segments that contain the target devices. Like broadcasting, multicasting only requires a single copy of the data to be transmitted, typically by sending streams of User Datagram Protocol (UDP) packets.

On a UPnP network, devices may advertise their capabilities using multicasting. Devices can multicast one or more service announcement messages. Each message describes an embedded device and/or service available from the message's originator. Other devices on the network listen on the multicast address for these service announcement messages. This information can be used to by the devices to utilize UPnP services.

Multicast service announcement messages may include an expiration time value that defines when the advertisements will expire. While the device remains available, the advertisements are continuously re-sent at periods of time that are less than the expiration time. If the device becomes unavailable, the device should explicitly cancel its advertisements. If the device is unable to cancel, the advertisements will expire on their own based on the expiration time contained in the service advertisements.

UPnP provides an alternate mechanism for service discovery besides multicast service announcements. When a device is added to the network, the device may initiate a search for devices of interest on the network. The device initiates this search by multicasting a search message containing a pattern that describes a device or service. If any network entity has an embedded device or service that matches the criteria in the search message, the entities will respond with a message similar to the previously described service advertisement.

It is the goal of UPnP to allow home electronics to be able to interact in order to further the usefulness of such devices. Since a 3G communications device can also typically process data, it is possible for such devices to communicate via UPnP networks. Because 3G mobile communications provide data connectivity and data processing on a device that is extremely portable. This will make such devices indispensable, both in and away from the user's homes. However, providing additional capabilities via mobile communications devices may require adapting the devices in ways that may not have been envisioned in the design of mobile communications architectures.

SUMMARY OF THE INVENTION

The present disclosure relates to a system, apparatus and method for exchanging data between a local network and a wireless device. In accordance with one embodiment of the invention, a method of exchanging data between a mobile device and a network involves receiving, via the network, multicast service announcements from a plurality of service providers. The multicast service announcements are stored in a cache. A service search request originating from the mobile device is received. A reply to the service search request is determined based on the multicast service announcements stored in the cache. The reply is provided to the mobile device in response to the service search request.

In more particular embodiments, the method involves receiving a service announcement originating from the mobile terminal, and providing repeated multicast service announcements to the network based on the service announcement originating from the mobile terminal. The method may also involve repeatedly checking the cache to determine an expiration time of each of the multicast service announcements, and removing from the cache selected multicast service announcements having expiration times that satisfy a threshold value.

In one arrangement, the network comprises a Universal Plug and Play network and/or the mobile device comprises a cellular phone. The multicast service announcements may be received by a data processing arrangement coupled to the network and the mobile device. The method may involve defining a data relay device type associated with the data processing arrangement and advertising the data relay device type on the network and/or with the mobile device.

In another embodiment of the present invention, a processor-readable medium has instructions stored thereon which are executable by a data processing arrangement capable of being coupled to a network and a mobile device. The instructions can be used for performing steps including 1) receiving, via the network, multicast service announcements from a plurality of service providers; 2) storing the multicast service announcements in a cache; 3) receiving a service search request originating from the mobile device; 4) determining a reply to the service search request based on the multicast service announcements stored in the cache; and 5) providing the reply to the mobile device in response to the service search request.

In another embodiment of the present invention, a system includes a network, a mobile device having a data interface, and a data processing arrangement coupled to the network and the mobile device. The data processing arrangement is configured to receive, via the network, multicast service announcements from a plurality of service providers. The multicast service announcements are stored in a cache. The data processing arrangement is configured to receive a service search request originating from the mobile device and determine a reply to the service search request based on the multicast service announcements stored in the cache. The reply is provided to the mobile device in response to the service search request.

In another embodiment of the present invention, an apparatus is configured for exchanging multimedia data between a network and a mobile device. The apparatus includes 1) means for receiving, via the network, multicast service announcements from a plurality of service providers via the network; 2) means for storing the multicast service announcements in a cache; 3) means for receiving a service search request originating from the mobile device; 4) means for determining a response to the service search request based on the multicast service announcements stored in the cache; and 5) means for providing the reply to the mobile device in response to the service search request.

In more particular arrangements, the apparatus includes means for receiving a service announcement originating from the mobile terminal and means for providing repeated multicast service announcements to the network based on the service announcement originating from the mobile terminal. The apparatus may also include means for repeatedly checking the cache to determine an expiration time of each of the multicast service announcements and means for removing from the cache selected multicast service announcements having expiration times that satisfy a threshold value.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of a system, apparatus, and method in accordance with the invention.

BRIEF DESCRIPTION OF THE DRAWINGS

The invention is described in connection with the embodiments illustrated in the following diagrams.

DETAILED DESCRIPTION OF THE INVENTION

In the following description of various exemplary embodiments, reference is made to the accompanying drawings which form a part hereof, and in which is shown by way of illustration various embodiments in which the invention may be practiced. It is to be understood that other embodiments may be utilized, as structural and operational changes may be made without departing from the scope of the present invention.

Generally, the present invention provides a way of providing local network connectivity to a mobile device via a service relay. The service relay may be used, for example, to reduce multicast network traffic when interfacing the mobile device to a network. The service relay acts as a gateway to the network and caches various protocol messages such as multicast service availability messages. The service relay only sends the multicast messages to a mobile device upon request of the mobile device. In this way, the service relay reduces the amount of wireless bandwidth that would otherwise be used in transmitting repeated service requests based on protocols of the network.

The present invention is applicable in any type of communication systems and networks, particularly to ad-hoc networks that rely on repeated broadcasting or multicasting of status message. In order to facilitate an understanding of the invention, the present invention is described in the context of a UPnP environment. It will be appreciated, however, that the invention may be applicable in any system or application where reducing multicast and broadcast network traffic to mobile devices is desired.

As previously described, UPnP devices may implement repeated multicasting of service announcement. Using repeated service announcement messages is a robust method of informing network entities of current status, although it is not a particularly efficient use of bandwidth. For networks with few connected UPnP devices, the small size and relative infrequency of the service advertisements may have negligible impact on network performance. However, for systems having low-bandwidth connections (e.g., a wireless connection), the service announcements may impact network performance, especially as the number of devices on the UPnP network increases.

Other usage scenarios may also cause deleterious affects on low-bandwidth connections in a UPnP network. For example, if a UPnP node that services many clients goes down and then comes back up, the network may see an "implosion" of responses as UPnP devices re-register and connect to the service. This implosion can cause problems of congestion and deadlock in the network and at the source.

Figure 1:
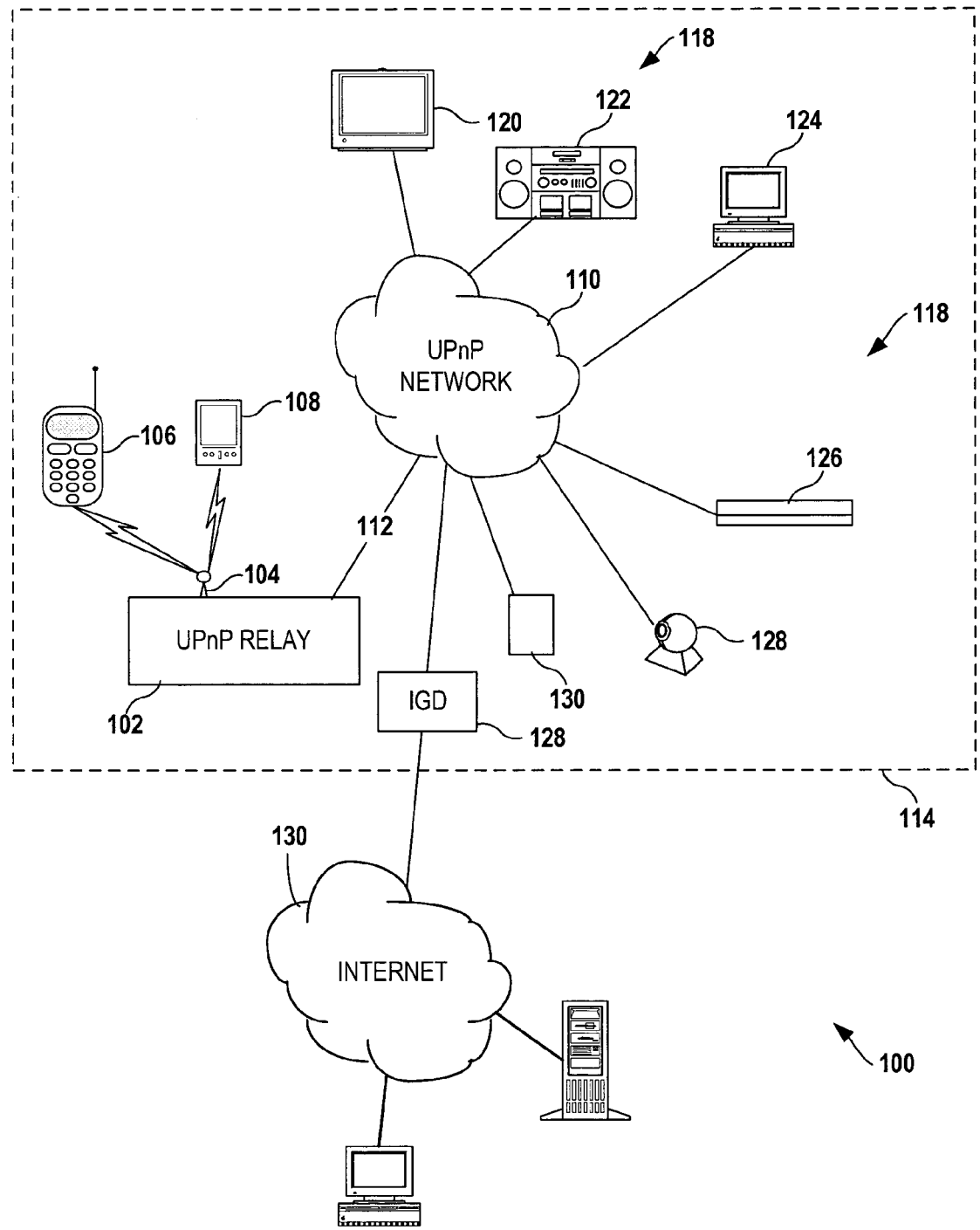
FIG. 1 illustrates a system for multicast data relay according to embodiments of the present invention.

To help prevent overload of low-bandwidth connections on a UPnP network, the present disclosure describes a UPnP relay that is coupled between the network and low bandwidth devices. In reference now to FIG. 1, a system 100 is shown utilizing a UPnP relay 102 according to embodiments of the present invention. The UPnP relay 102 may be configured to communicate over a wireless interface 104 with UPnP wireless communications devices such as a cell phone 106 and a Personal Digital Assistant (PDA) 108. The UPnP relay 102 is also coupled to an UPnP network 110 as indicated by path 112.

The UPnP network 110 (or similar networking technology) provides data interactions between devices in a local environment 114. The local environment 114 typically includes a home or office, although it will be appreciated that other environments may include UPnP compatible devices, including automobiles, airplanes, boats, public wireless hotspots, etc. The UPnP network 110 may couple devices 118 such as televisions 120, audio systems 122, computers 124, digital media centers 126 (e.g., set-top boxes, MP3 jukeboxes, personal video recorders, media hubs, etc.), cameras 128, and other devices, represented by generic UPnP device 130.

The devices 118 coupled with the UPnP network 110 may also be configured to communicate outside the local environment 114. For example, an Internet Gateway Device (IGD) 128 may provide communications to networks outside the local environment, such as the Internet 130. The IGD 128 is an IP addressable device typically residing at the edge of a home or small-business network. The IGD 128 interconnects the UPnP network 110 with a WAN interface for Internet access. The IGD 128 also provides local addressing and routing services between one or more LAN segments and to and from the Internet. The devices 118 may be arranged to access Internet services via the IGD 128.

The UPnP network 110 may include any wired or wireless networking interfaces known in the art. Commonly used networking technologies include IEEE 802.11 wireless local area networks (WLAN) 130, Ethernet, Bluetooth, and direct wired connections (e.g., USB, Ethernet, IEEE 1394, powerline networking, serial/parallel data connections, etc). The devices 102 may communicate via the UPnP network using any compatible protocol stack. In particular, UPnP networks utilize TCP/IP and other Web technologies to enable proximity networking in addition to control and data transfer among networked devices.

The UPnP relay 102 provides the wireless communications devices 106, 108 access to the UPnP network 110. The UPnP relay 102 includes functionality that allows the wireless devices 106, 108 to transparently access the UPnP network 110, yet reduces bandwidth consumption on the wireless links. The UPnP relay 102 achieves this by, among other things, caching multicast service announcements originating from devices 118 on the UPnP network 110.

Figure 2:
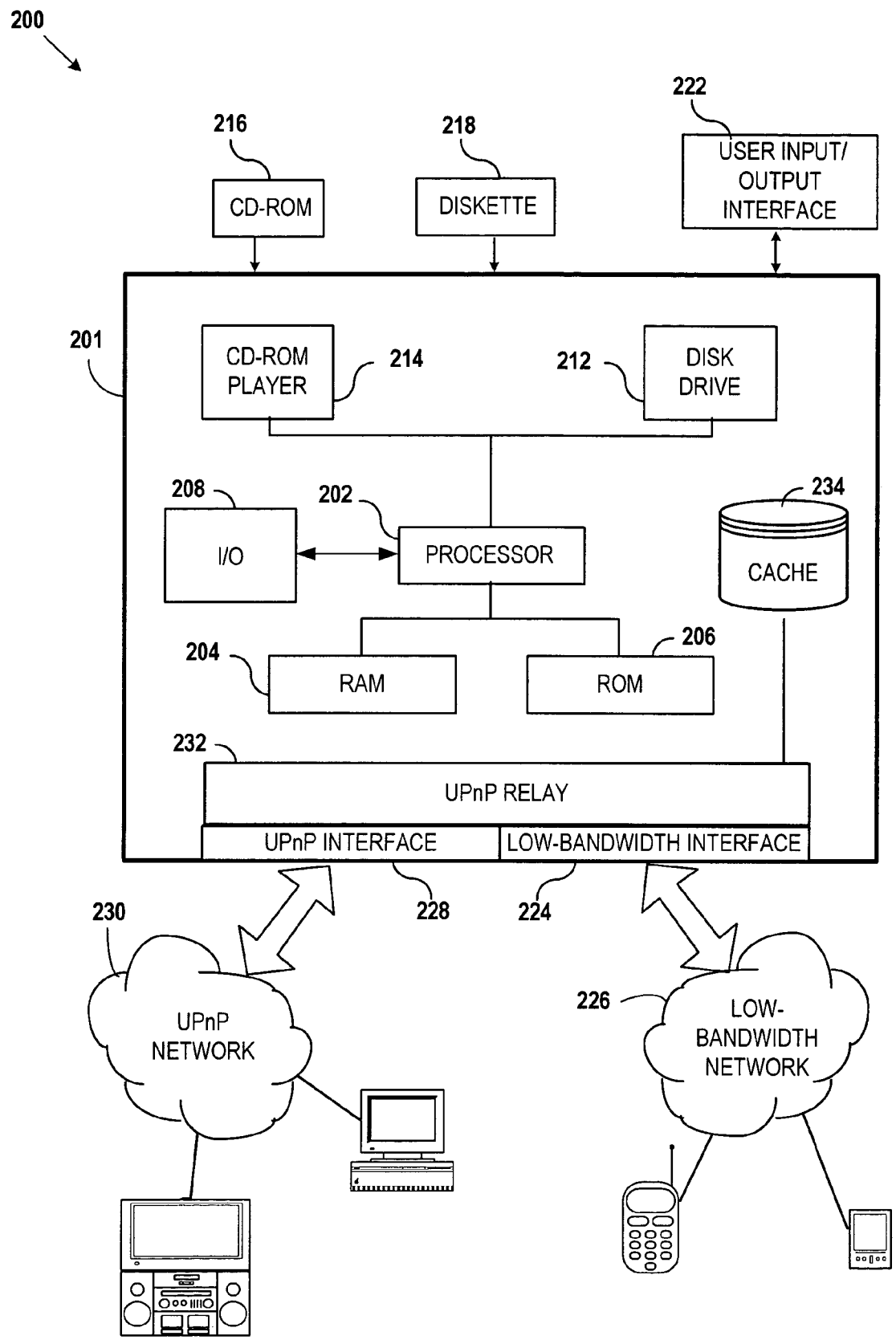
FIG. 2 illustrates an apparatus for relaying multicast data according to embodiments of the present invention.

The UPnP relay 102 may be implemented using any combination of hardware and software known in the art. The UPnP relay 102 may be implemented as a standalone device, a processor-implemented service, or be included as part of other electronic equipment, including computers, routers, wireless access points, set-top boxes, etc. FIG. 2 shows an example computing structure 200 suitable for providing UPnP relay functionality according to embodiments of the present invention.

The computing structure 200 includes a computing arrangement 201. The computing arrangement 201 may include custom or general-purpose electronic components. The computing arrangement 201 includes a central processor (CPU) 202 that may be coupled to random access memory (RAM) 204 and/or read-only memory (ROM) 206. The ROM 206 may include various types of storage media, such as programmable ROM (PROM), erasable PROM (EPROM), etc. The processor 202 may communicate with other internal and external components through input/output (I/O) circuitry 208. The processor 202 carries out a variety of functions as is known in the art, as dictated by software and/or firmware instructions.

The computing arrangement 201 may include one or more data storage devices, including hard and floppy disk drives 212, CD-ROM drives 214, and other hardware capable of reading and/or storing information such as DVD, etc. In one embodiment, software for carrying out the operations in accordance with the present invention may be stored and distributed on a CD-ROM 216, diskette 218 or other form of media capable of portably storing information. These storage media may be inserted into, and read by, devices such as the CD-ROM drive 214, the disk drive 212, etc. The software may also be transmitted to computing arrangement 201 via data signals, such as being downloaded electronically via a network, such as the Internet. The computing arrangement 201 may be coupled to a user input/output interface 222 for user interaction. The user input/output interface 222 may include apparatus such as a mouse, keyboard, microphone, touch pad, touch screen, voice-recognition system, monitor, LED display, LCD display, etc.

The computing arrangement 201 may be coupled to other computing devices via networks. In particular, the computing arrangement may include a low-bandwidth (e.g., wireless, infrared) network interface 224 for interacting with a low-bandwidth network 226, and a UPnP network interface 228 for interfacing with a UPnP network 230 The network interfaces 224, 228 may include hardware and software components, including drivers, programs, and protocol modules. The network interfaces 224, 228 communicate with a UPnP relay module 232 that is configured to perform data transfers between the low-bandwidth network 226 and UPnP network 230.

The memory of the computing arrangement 201 may be used to store processor executable instructions for carrying out tasks of the UPnP relay module 232. For example, the UPnP relay module 232 may send and receive multicast service announcements via the network interfaces 224, 228. The UPnP relay module 232 may store these announcements in a cache 234. The cache 234 may be a component of the computing arrangement 204 (e.g., persistent or non-persistent writable memory) or may be part of an externally accessible storage arrangement such as a network drive. The UPnP relay module 232 can read the contents of the cache 234 in order respond to service queries received via the wireless network interface 224. The UPnP relay module 232 may also maintain the cache 234, such as by removing expired service announcements stored therein.

Figure 3:
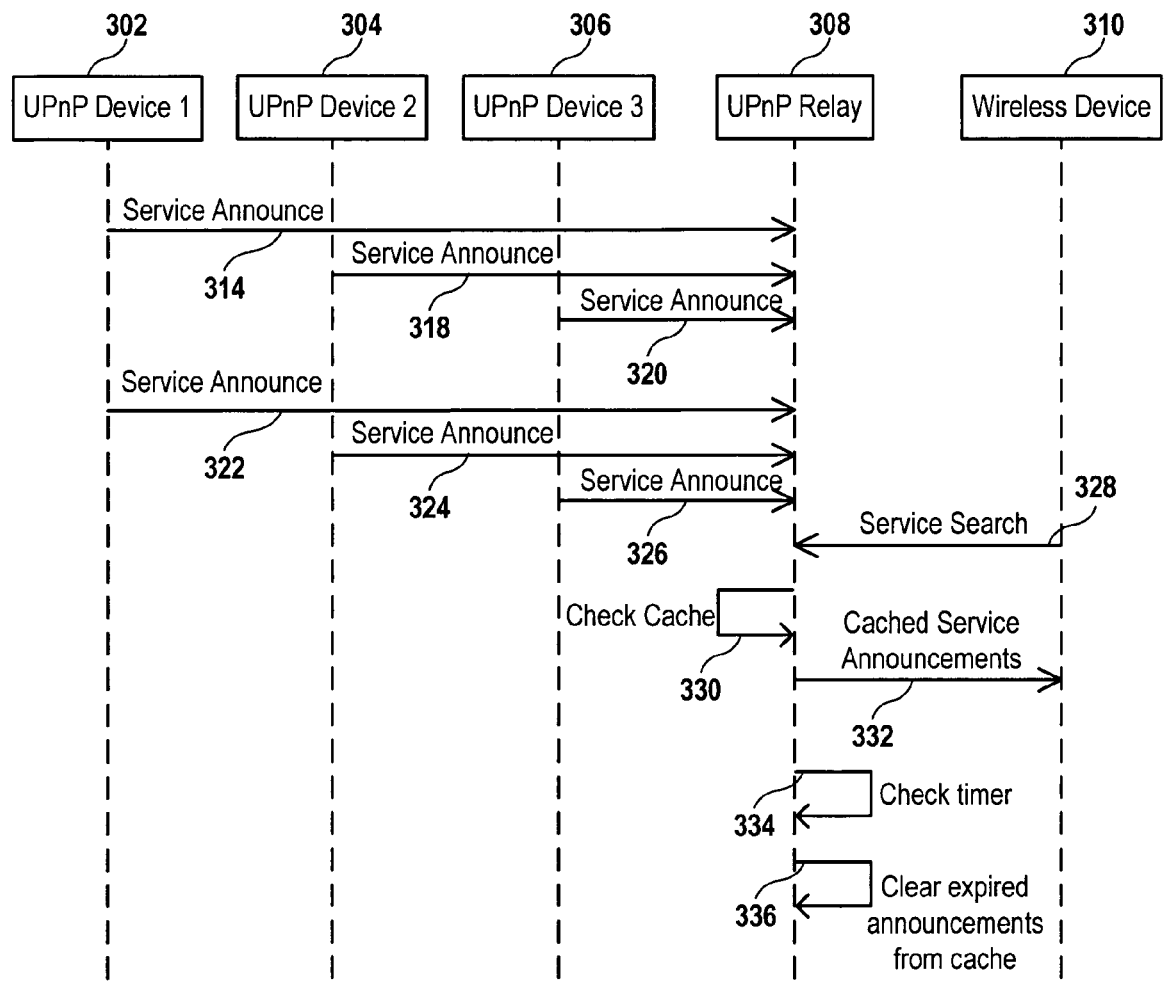
FIG. 3 illustrates sequences for relaying multimedia data received from a network according to embodiments of the present invention.

In reference now to FIG. 3, a sequence diagram illustrates an example of caching multicast service announcements according to embodiments of the present invention. In FIG. 3, the UPnP network includes three UPnP devices 302, 304, 306, a UPnP relay 308, and a wireless device 310. The UPnP relay is arranged to listen to multicast data on the UPnP network, including service announcements. For example, each of the UPnP devices 302, 304, 306 send respective multicast service announcements 314, 318, 320 to the UPnP relay 308. The multicast service announcements 314, 318, 320 may utilize a NOTIFY method as specified in the UPnP standard. The NOTIFY method includes a notification subtype of Simple Service Discovery Protocol (SSDP) ssdp:alive as well as entries that define embedded devices and services of the root devices 302, 304, and 306.

The UPnP relay 308 caches the service announcements 314, 318, 320. When a later set of service announcements 322, 324, 326 arrive, the UPnP relay 308 may update the cache as necessary. If any of the later announcement 322, 324, or 326 include information that indicates a device is off line (e.g., an ssdp:byebye in the notification subtype header) the UPnP relay 308 can remove this entry from the cache.

It will be appreciated that the UPnP relay 308 itself is a UPnP device. Therefore, the UPnP relay 308 may send out its own multicast service announcements (not shown) to both the UPnP network and the wireless device 310. The UPnP relay 308 may define a new device type (e.g., mobile services relay or power management service) and form service announcements based on that device type. For example, the UPnP relay 308 may be used as a proxy server for power management. A relay device utilizing the UPnP relay 308 can provide power management functions for other devices that want to go into sleep mode yet still maintain a presence on the UPnP network. The relay will cache announcements and for these devices and send out UPnP service announcements on behalf of them Such service announcements may also be used by the wireless device 310 to enter a reduced bandwidth mode where the wireless device 310 does not utilize certain multicast channels in order to conserve bandwidth. In this mode, the wireless device 310 relies on the UPnP relay 308 for information regarding UPnP devices and services.

When the mobile device 310 attempts to use a service on the UPnP network, it can send a search query 328 to the UPnP relay 308. The search query 328 may utilize an M-SEARCH method as specified in the UPnP standard. The UPnP relay 308 is configured to check its cache 330 in response to the query 328 to see if any cached service advertisements satisfy the query 328. If so, cached service announcements 332 that satisfy the query 328 are returned to the mobile device 310. If service announcements that satisfy the query 328 are not found in the cache, the UPnP relay 308 may then forward the M-SEARCH query 328 to the network for further processing (not shown).

As previously described, devices on a UPnP network should send a service announcement when a device or service goes off-line. However, devices may experience a failure or be abruptly shut-off before having a chance to send this message. Therefore the service announcements contain a CACHE-CONTROL header entry that specifies the amount of time the advertisement is valid. Any devices that cache service message will occasionally revisit the messages and remove any that have not been refreshed by the time indicated in the CACHE-CONTROL header.

Since the UPnP relay 308 contains a cache used by the wireless device 310, the relay 308 will need to check the age of cache entries. This is illustrated in FIG. 3, where the UPnP relay 308 repeated executes a timed function 334 that checks all entries in the cache against an expiration threshold value. If any announcements are expired, they are removed 336 from the cache.

As shown in FIG. 3, the UPnP relay 308 reduces multicast traffic to the wireless device 310 by filtering multicast service message sent by devices 302, 304, 306 on the UPnP network.

It will be appreciated that the wireless device 310 may also have services to be advertised on the network. The UPnP relay can also cache the service messages from the wireless device 310 and repeatedly multicast these announcements on the network. This is illustrated in FIG. 4, which includes a sequence diagram for caching wireless device service announcements according to embodiments of the present invention.

Figure 4:
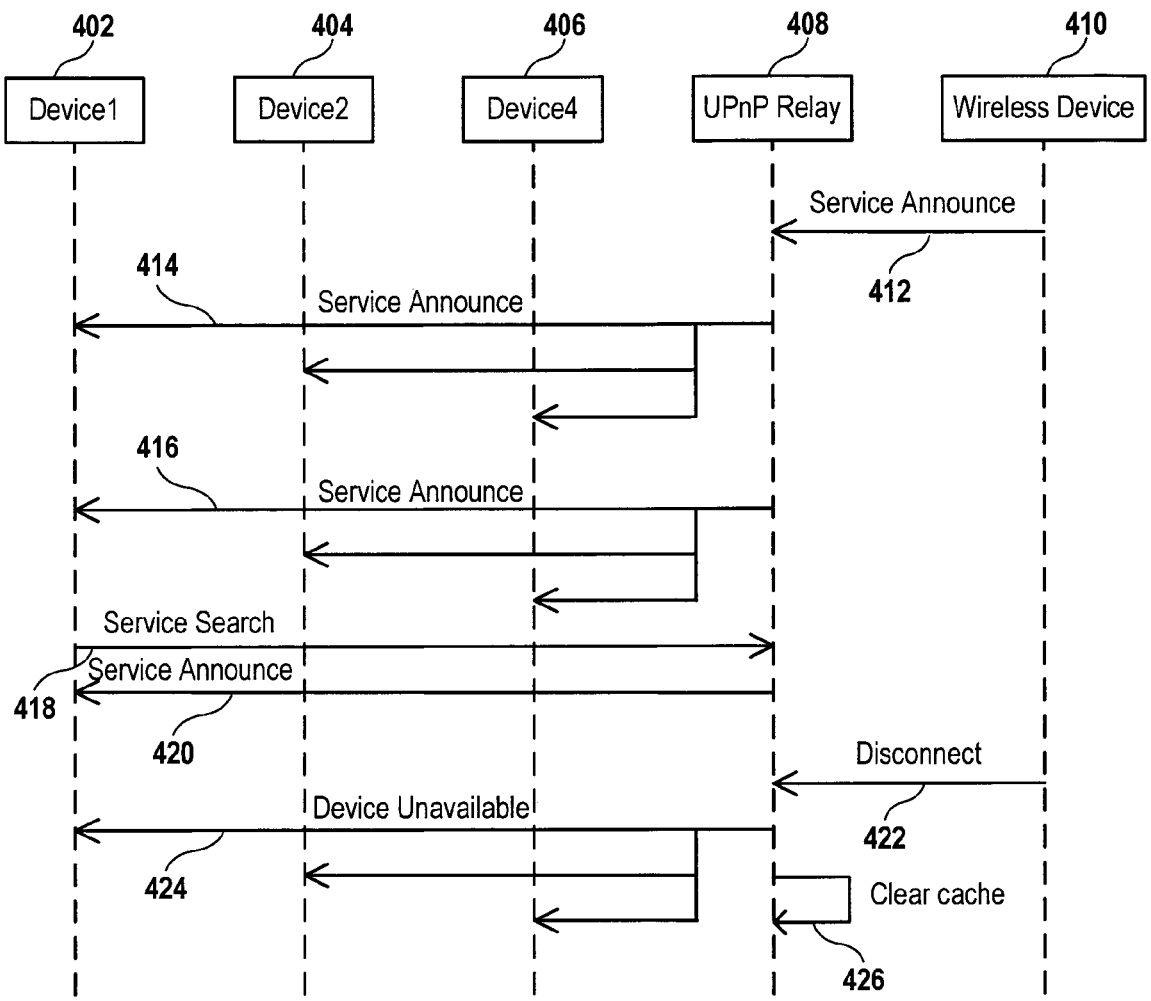
FIG. 4 illustrates sequences for relaying multimedia data from a wireless device to a network according to embodiments of the present invention
Figure 5:
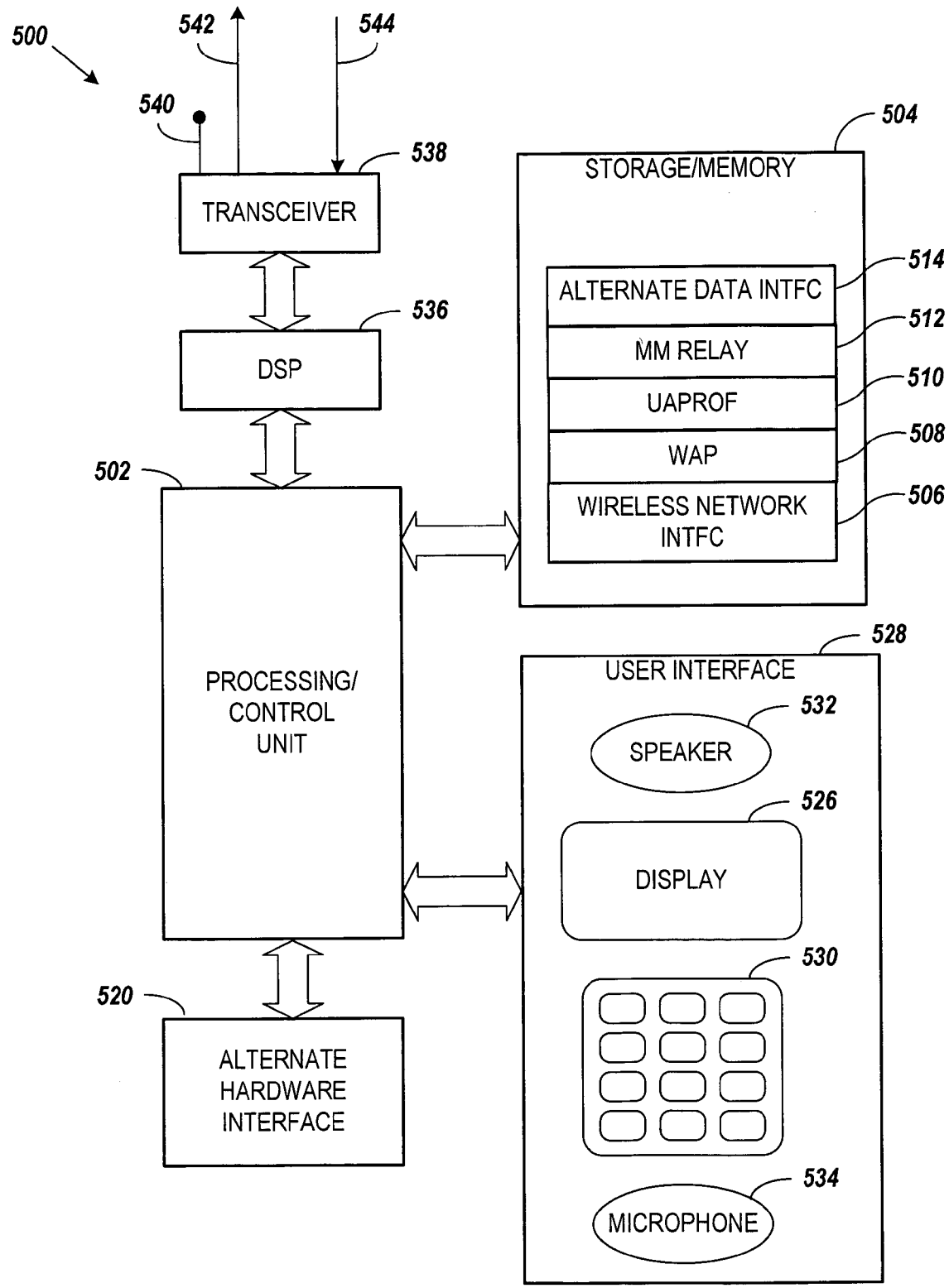
FIG. 5 illustrates a mobile data processing device according to embodiments of the present invention.

As in FIG. 3, the diagram of FIG. 4 shows a UPnP network with three UPnP devices 402, 404, 406, a UPnP relay 408, and a wireless device 410. The UPnP relay is arranged to listen to multicast data (e.g., service announcement 412) originating from the wireless device 410. Instead of the wireless device 410 repeatedly multicasting the service announcement 412 on the UPnP network, the UPnP relay 408 sends these announcements, as shown with the multicast service announcements 414 and 416. The UPnP relay 408 may repeatedly send out announcements 414, 416 based on receiving a single announcement 412 from the wireless device 410. Alternatively, the wireless device may also repeatedly send its announcement 412, but at a much lower rate than the announcements 414, 416 sent by the UPnP relay 408.

Because the UPnP relay 408 has cached one or more service announcements of the wireless device 410, the UPnP relay 408 can respond to a service search request 418 sent by a device 402 on the UPnP network. The response message 420 can be based on cached service announcements of the wireless device 410. In this way, the UPnP relay 408 can further reduce bandwidth by restricting service queries to the wireless device 410.

Since the UPnP relay 408 handles repeated service announcements for the wireless device 410, a mechanism should be included to inform the UPnP network when the wireless device 410 and its services are no longer available. In FIG. 4, this is illustrated by a disconnect message 422 sent from the wireless device 410 to the UPnP relay 408. The disconnect message 422 may be the standard UPnP device unavailable message (ssdp:byebye), or the message 422 may be the detection of an event, such as a lost connection to the wireless device 410. In either event, the UPnP relay 408 can form a service unavailable message 424 and multicast it to the UPnP network, as well as clearing 426 the service data from the cache.

The procedures illustrated in FIG. 4 are only examples of how a UPnP relay 408 might interact with a wireless device 410. Other features that the UPnP relay 408 could implement include power management features. When the wireless device 410 is sleeping, the UPnP relay 408 can send UPnP announcements on behalf the sleeping device 410. The UPnP relay 408 can also store information about the sleeping device 410 that allows the UPnP relay 408 to wake up the wireless device 410 in case some other device 402, 404, 406 requests a service from the sleeping device 410.

Hardware, firmware, software or a combination thereof may be used to perform the various functions and operations described herein of a distributed-computation program. Articles of manufacture encompassing code to carry out functions associated with the present invention are intended to encompass a computer program that exists permanently or temporarily on any computer-usable medium or in any transmitting medium which transmits such a program. Transmitting mediums include, but are not limited to, transmissions via wireless/radio wave communication networks, the Internet, intranets, telephone/modem-based network communication, hard-wired/cabled communication network, satellite communication, and other stationary or mobile network systems/communication links. From the description provided herein, those skilled in the art will be readily able to combine software created as described with appropriate general purpose or special purpose computer hardware to create a distributed-computation system, apparatus, and method in accordance with the present invention.

The foregoing description of the exemplary embodiments of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather defined by the claims appended hereto.

What is claimed is:

1. A method comprising:
    coupling a multicast relay server to receive multicast data via an ad-hoc peer-to-peer network;
    coupling the multicast relay server to a mobile device, wherein the mobile device uses the multicast relay as a gateway to the ad-hoc, peer-to-peer network;
    receiving multicast messages at the multicast relay server from the ad-hoc, peer-to-peer network on behalf of the mobile device;
    selectively filtering the multicast messages sent to the mobile device via the multicast relay server to reduce network bandwidth used by the mobile device, wherein the selective filtering involves blocking multicast service announcements received at the multicast relay server from being sent to the mobile device and relaying data from particular multicast messages to the mobile device that allows the mobile device to transparently interact with the ad-hoc, peer-to-peer network;
    caching the multicast service announcements at the multicast relay server on behalf of the mobile device;
    receiving, at the multicast relay server, a service announcement originating from the mobile device; and
    providing, via the multicast relay server on behalf of the mobile device, repeated multicast service announcements to the ad-hoc, peer-to-peer network based on the service announcement originating from the mobile device.

2. The method of claim 1, further comprising:
    receiving at the multicast relay, a service search request originating from the mobile device;
    determining a reply to the service search request based on the cached multicast service announcements;
    providing the reply to the mobile device in response to the service search request.

3. The method of claim 1, further comprising:
    caching the service announcement originating from the mobile device at the multicast relay server;
    receiving a search query from the ad-hoc peer-to-peer network at the multicast relay; and
    providing, in response to the search query, a response based on the cached service announcement.

4. The method of claim 1, wherein the ad-hoc, peer-to-peer network comprises a universal plug and play network, and wherein the service announcement originating from the mobile device comprises a universal plug and play service announcement.

5. The method of claim 1, wherein providing the repeated multicast service announcements on behalf of the mobile device occurs in response to determining that the mobile device is in a sleep state.

6. The method of claim 5, further comprising:
    receiving a service request targeted for the mobile device while the mobile device is in the sleep state; and
    waking up the mobile device in response to the request.

7. An apparatus comprising:
    a first network interface capable of communicating with a mobile device;
    a second network interface capable of communicating via an ad-hoc, peer-to-peer network;
    a processor coupled to the first and second network interface; and
    memory coupled to the processor, the memory having instructions that cause the processor to provide a gateway to the ad-hoc, peer-to-peer network on behalf of the mobile device by causing the apparatus to perform:
        receiving multicast messages from the ad-hoc, peer-to-peer network on behalf of the mobile device;
        selectively filtering the multicast messages sent to the mobile device to reduce network bandwidth used by the mobile device, wherein the selective filtering involves blocking multicast service announcements received at the apparatus from being sent to the mobile device and relaying data from particular multicast messages to the mobile device that allows the mobile device to transparently interact with the ad-hoc, peer-to-peer network;
        store the multicast service announcements in a cache on behalf of the mobile device;
        receive a service announcement originating from the mobile device; and
        provide, on behalf of the mobile device, repeated multicast service announcements to the ad-hoc, peer-to-peer network based on the service announcement originating from the mobile device.

8. The apparatus of claim 7, wherein the processor further causes the apparatus to:
    receive a service search request originating from the mobile device;
    determine a reply to the service search request based on the cached multicast service announcements;
    provide the reply to the mobile device in response to the service search request.

9. The apparatus of claim 7, further comprising a cache, and wherein the processor further causes the apparatus to:
    cache the service announcement originating from the mobile device in the cache;
    receiving a service search request from the ad-hoc peer-to-peer network; and
    providing, in response to the service search request, a response based on the cached service announcement.

10. The apparatus of claim 7, wherein the ad-hoc, peer-to-peer network comprises a universal plug and play network, and wherein the service announcement originating from the mobile device comprises a universal plug and play service announcement.

11. The apparatus of claim 7, wherein providing the repeated multicast service announcements on behalf of the mobile device occurs in response to determining that the mobile device is in a sleep state.

12. The apparatus of claim 11, wherein the processor further causes the apparatus to:
    receiving a service request targeted for the mobile device while the mobile device is in the sleep state; and
    waking up the mobile device in response to the request.

13. A non-transitory computer-readable storage medium having instructions stored thereon which are executable by a data processing arrangement for performing: coupling with an ad-hoc, peer-to-peer network;

coupling to a mobile device for purposes of providing to the mobile device a gateway to the ad-hoc, peer-to-peer network;

receiving multicast messages from the ad-hoc, peer-to-peer network on behalf of the mobile device;

selectively filtering the multicast messages sent to the mobile device to reduce network bandwidth used by the mobile device, wherein the selective filtering involves blocking multicast service announcements from being sent to the mobile device and relaying data from particular multicast messages to the mobile device that allows the mobile device to transparently interact with the ad-hoc, peer-to-peer network;

storing the multicast service announcements in a cache on behalf of the mobile device;

receiving a service announcement originating from the mobile device; and providing, on behalf of the mobile device, repeated multicast service announcements to the ad-hoc, peer-to-peer network based on the service announcement originating from the mobile device.

14. The non-transitory computer-readable storage medium of claim 13, wherein the instructions are further executable to perform:

receiving a service search request originating from the mobile device;

providing a reply to the service search request based on the cached multicast service announcements.

15. The non-transitory computer-readable storage medium of claim 13, wherein providing the repeated multicast service announcements on behalf of the mobile device occurs in response to determining that the mobile device is in a sleep state.

16. The non-transitory computer-readable storage medium of claim 15, wherein the instructions are further executable to perform:

receiving a service request targeted for the mobile device while the mobile device is in the sleep state; and waking up the mobile device in response to the request.

17. A system comprising:

an ad-hoc, peer-to-peer network;

a mobile device; and a multicast relay server coupled as a gateway to the ad-hoc, peer-to-peer network on behalf of the mobile device, the multicast relay server further configured to:

receive multicast messages from the ad-hoc, peer-to-peer network on behalf of the mobile device;

selectively filter the multicast messages sent to the mobile device to reduce network bandwidth used by the mobile device, wherein the selective filtering involves blocking multicast service announcements from being sent to the mobile device and relaying data from particular multicast messages to the mobile device that allows the mobile device to transparently interact with the ad-hoc, peer-to-peer network;

store the multicast service announcements in a cache on behalf of the mobile device;

receive, a service announcement originating from the mobile device; and provide, on behalf of the mobile device, repeated multicast service announcements to the ad-hoc, peer-to-peer network based on the service announcement originating from the mobile device.

18. The system of claim 17, wherein the ad-hoc, peer-to-peer network comprises a universal plug and play network, and wherein the service announcement originating from the mobile device comprises a universal plug and play service announcement.

19. The system of claim 17, further comprising a second network having lower bandwidth capacity that the ad-hoc, peer-to-peer network, and wherein the multicast relay server is coupled to the mobile device via the second network.

20. An apparatus comprising:

means for communicating with a mobile device;

means for providing a gateway to an ad-hoc, peer-to-peer network on behalf of the mobile device;

means for receiving multicast messages from the ad-hoc, peer-to-peer network on behalf of the mobile device;

means for selectively filtering the multicast messages sent to the mobile device to reduce network bandwidth used by the mobile device, wherein the selective filtering involves blocking multicast service announcements from being sent to the mobile device and relaying data from particular multicast messages to the mobile device that allows the mobile device to transparently interact with the ad-hoc, peer-to-peer network;

means for caching the multicast service announcements on behalf of the mobile device;

means for receiving a service announcement originating from the mobile device; and means for providing, on behalf of the mobile device, repeated multicast service announcements to the ad-hoc, peer-to-peer network based on the service announcement originating from the mobile device.

21. The apparatus of claim 20, wherein the multicast messages comprise multicast service announcements, the apparatus further comprising:

means for receiving a service search request originating from the mobile device;

means for determining a reply to the service search request based on the cached multicast service announcements; and means for providing the reply to the mobile device in response to the service search request.

\* \* \* \* \*